(12) United States Patent
Smith et al.

(10) Patent No.: US 7,107,859 B2
(45) Date of Patent: Sep. 19, 2006

(54) ULTRASONIC SEEPAGE METER

(75) Inventors: Christopher Smith, Mattituck, NY (US); Ronald Paulsen, Medford, NY (US); Teng-Fong Wong, Stony Brook, NY (US)

(73) Assignee: Groundwater Seepage Inc., NY (US)

( * ) Notice: Subject to any disclaimer, the term of this patent is extended or adjusted under 35 U.S.C. 154(b) by 0 days.

(21) Appl. No.: 11/069,502

(22) Filed: Mar. 1, 2005

(65) Prior Publication Data

US 2005/0252306 A1 Nov. 17, 2005

Related U.S. Application Data

(63) Continuation of application No. 10/698,172, filed on Oct. 29, 2003, now Pat. No. 6,874,371.

(51) Int. Cl.
*G01F 1/32* (2006.01)

(52) U.S. Cl. .................................. 73/861.23

(58) Field of Classification Search ............ 73/861.23, 73/861
See application file for complete search history.

(56) References Cited

U.S. PATENT DOCUMENTS 6,874,371 B1 * 4/2005 Smith et al. ............. 73/861.23

OTHER PUBLICATIONS

Belander, T.V. et al., "Seepage Meter Error," Limnology and Oceanography, v. 37, No. 8, 1992, pp. 1787-1795.
Cherkauer, D.A., et al., "A Remotely Operated Seepage Meter for Use in Large Lakes and Rivers," Ground Water, v. 26, No. 2, pp. 165-171.
Lee, D.R., "A device for measuring seepage flux in lakes and estuaries," Limnology and Oceanography, v. 22, No. 1, 1977, pp. 140-147.
Shaw, R.D., et al., "Anomalous, short-term influx of water into seepage meters," Limnology and Oceanography, v. 34, No. 7, 1989, pp. 1343-1351.
Taniguchi, M., et al., "Continuous Measurements of Ground-Water Seepage Using an Automatic Seepage Meter," Ground Water, v. 31, No. 4, 1993, pp. 675-679.
Taniguchi, M. ,et al., "Measurements of submarine groundwater discharge rates by a continuous heat-type automated seepage meter in Osaka Bay, Japan," 2001, pp. 271-277.
Taniguchi, M., et al., "Investigation of submarine groundwater discharge," Hydrological Processes, v. 16, 2002, pp. 2115-2129.
Paulsen, R.J., et al., "Development and Evaluation of an Ultrasonic Ground Water Seepage Meter," Ground Water, v. 39, No. 6, 2001, pp. 904-911.

* cited by examiner

*Primary Examiner*—Jewel V. Thompson
(74) *Attorney, Agent, or Firm*—Dickstein Shapiro LLP

(57) ABSTRACT

An ultrasonic flow meter has been adapted for such measurements in the submarine environment. Connected to a collection funnel, the meter houses two piezoelectric transducers mounted at opposite ends of a cylindrical flow tube. By monitoring the perturbations of fluid flow on the propagation of sound waves inside the flow tube, the ultrasonic meter can measure both forward and reverse fluid flows in real time. Laboratory and field calibrations show that the ultrasonic meter can resolve groundwater discharges in both the forward and reverse directions on the order of 0.1 μm/s (<1 cm/d), and it is sufficiently robust for deployment in the field for several days. Data collected with the meter elucidate the temporal and spatial heterogeneity of submarine groundwater discharge and its interplay with tidal loading and other driving forces. A negative correlation between the discharge and tidal elevation can be observed.

20 Claims, 5 Drawing Sheets

ULTRASONIC SEEPAGE METER

This application is a continuation of U.S. patent application Ser. No. 10/698,172, titled "Ultrasonic Seepage Meter," filed Oct. 29, 2003, now U.S. Pat. No. 6,874,371, which is hereby incorporated by reference herein.

FIELD OF THE INVENTION

The present invention relates to an apparatus and method for measuring the velocity and other characteristics of submarine groundwater discharge as it enters or exits a surface water body, and more particularly to a remotely deployable time transient seepage meter that utilizes ultrasonic technology to continuously quantify and record the measured information. The present invention is intended for use in environmental fields including hydrology, oceanography, geology, ecology and all other related fields.

BACKGROUND OF THE INVENTION

Understanding the exchange between seepage and overlying surface water has become increasingly important due to the potential impacts to the environment resulting from anthropogenic land uses. The key input for submarine groundwater discharge (SGD) in near-shore environments is believed to be the discharge from land to surface water induced by the hydraulic gradient in the terrestrial aquifer. However, significant contribution to SGD may also derive from groundwater circulation and oscillating flow induced by tidal stage as well as salinity and thermal variations. This discharge carries with it contaminants and/or nutrients, dissolved and/or colloidal, that have the potential to impact the chemical budget of surface water ecosystems. This impact, along with other biological and physical impacts, may be heightened in smaller bodies of water such as embayments or lagoons due to their limited volume and restricted fluid exchange with the open ocean.

A major obstacle in studying SGD is accurately measuring groundwater seepage across the sediment-water interface. Discharge rates may be as low as <1 cm/day and these low rates make quantification of SGD inherently difficult. In addition, the ebullition of gas from sediments is a common event, further increasing the difficulty of accurately measuring SGD.

Current methodologies for measuring SGD have included a system that utilizes a 4-liter plastic collection bag and a cut off section of a 55 gallon drum as described by D. R. Lee, in "A Device for Measuring Seepage Flux in Lakes and Estuaries," *Limnology and Oceanography*, 22: 140–147, 1977. Using this device, the open-ended section of a cut off section of a 55-gallon drum is inserted into the sediment. Attached to the drum via an outflow port is a 4-liter plastic bag that collects the seepage. The volume of the bag and sampling interval are recorded and the specific discharge velocity is obtained by dividing the volume of collected seepage over the time interval by the area of the drum. Although this method can be effective, various errors have been associated with the device that must be corrected for prior to sampling. Another disadvantage to this method is that it is quite labor intensive since the plastic bags need to be monitored and replaced continuously. In addition, data collected are averages over the specified time interval and may not fully quantify short term events. Furthermore, this method is incapable o measuring reverse flow.

Continuous logging seepage meters have been developed utilizing heat-pulse technology as described by M. Taniguchi and Y. Fukuo, in "Continuous Measurements of Ground-Water Seepage Using an Automatic Seepage Meter," *Ground Water*, 31, no. 4: 675–679, 1993. This method, however, cannot be monitored during deployment and may therefore malfunction during the collection period without notice. Another disadvantage of this method is that it cannot measure seepage in intertidal environments in which the seepage meter becomes periodically air bound during low tide events. In addition, variations in the water density and temperature can also affect the accuracy of the heat pulse method.

Piezometric head measurements have also be used to estimate the specific discharge of groundwater to surface waters. This method requires the installation of monitoring wells offshore to monitor the hydraulic head beneath the surface water. The method can determine if water is entering or exiting the surface water but in order to determine the specific discharge estimates of the hydraulic conductivity of the sediment are needed. However, this method is not a direct measurement of seepage but and estimate based on head measurements and sediment conductivity.

Accordingly, there is a need for a remotely-deployable device capable of accurately measuring SGD in both the forward and reverse flow directions.

SUMMARY OF THE INVENTION

It is the object of the present invention to overcome the shortcomings of previous methods to quantify SGD. The invention is intended to provide a robust, time transient meter that is able to continuously record the wide range of seepage rates observed in the field while providing a less labor intensive and more accurate method of quantifying SGD in both the forward and reverse flow directions.

One advantage of the present invention is to be able to continuously record groundwater discharge in subsurface (intertidal and subsurface) environments. Another feature of the present invention is the ability to utilize velocity of sound data collected by the meter to determine The salinity and therefore source of the water passing through the seepage meter. This feature provides an advantage over other methods by differentiating terrestrial groundwater from surrounding surface water in marine environments. Therefore, the source of the discharge and any toxic or hazardous constituents present in the discharge is more easily determined and quantified. Another advantage of the present invention is the ability to accurately and continuously quantify very low flow rates regardless of changes in the temperature, density or the affect of ebullition of gases from the sediments.

The above and other objects, advantages, and features are accomplished by providing a mechanism capable of quantifying groundwater seepage rate and quality. A seepage meter in accordance with the present invention generally comprises a funneling device to collect the groundwater flow through an inlet which then discharges through this device via a discharge outlet, for recording water temperature, tidal stage, and electrical conductance using probes mounted in the device; an ultrasonic flow tube, for accepting the discharge from the collection device through a collection inlet and discharging the groundwater through a discharge outlet; a data logger, connected to the flow tube which sends signal to the flow tube and receives data from the flow tube which then is used to determine the flow rate of groundwater through the flow tube.

Further, in accordance with the above objects, advantages, and features the present invention provides a device that quantifies the rate of submarine groundwater discharge using inlet means, outlet means, connected to the inlet and outlet means for determining seepage rate; control means, for sending signal to the flow tube; recording means, to quantify seepage rate using travel time data from the flow tube; valve means, for transferring discharge from the collection device to an additional discharge outlet connected to a pump for sampling.

In further accordance with the above objects, advantages, and features the present invention provides a methodology for quantifying submarine groundwater discharge by utilizing a) collecting water through a collection funnel, b) directing the collected water through an in line ultrasonic flow tube, c) using a data logger to quantify and record flow rate, and d) repeating steps a) through c).

BRIEF DESCRIPTION OF THE SEVERAL DRAWINGS

DESCRIPTION OF THE INVENTION

Figure 1:
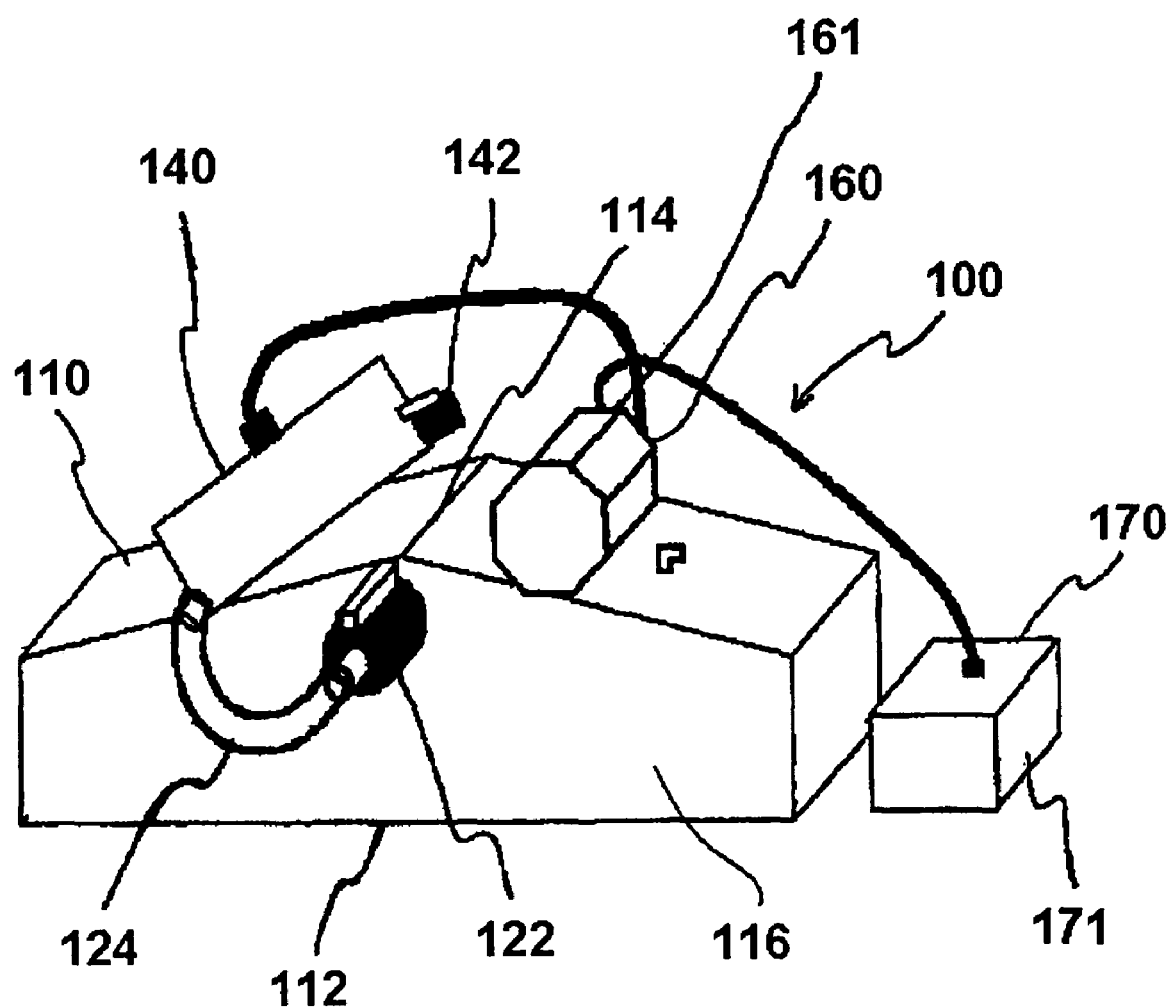
FIG. 1 is a perspective view of a preferred embodiment of an ultrasonic seepage meter in accordance with the present invention.
Figure 2:
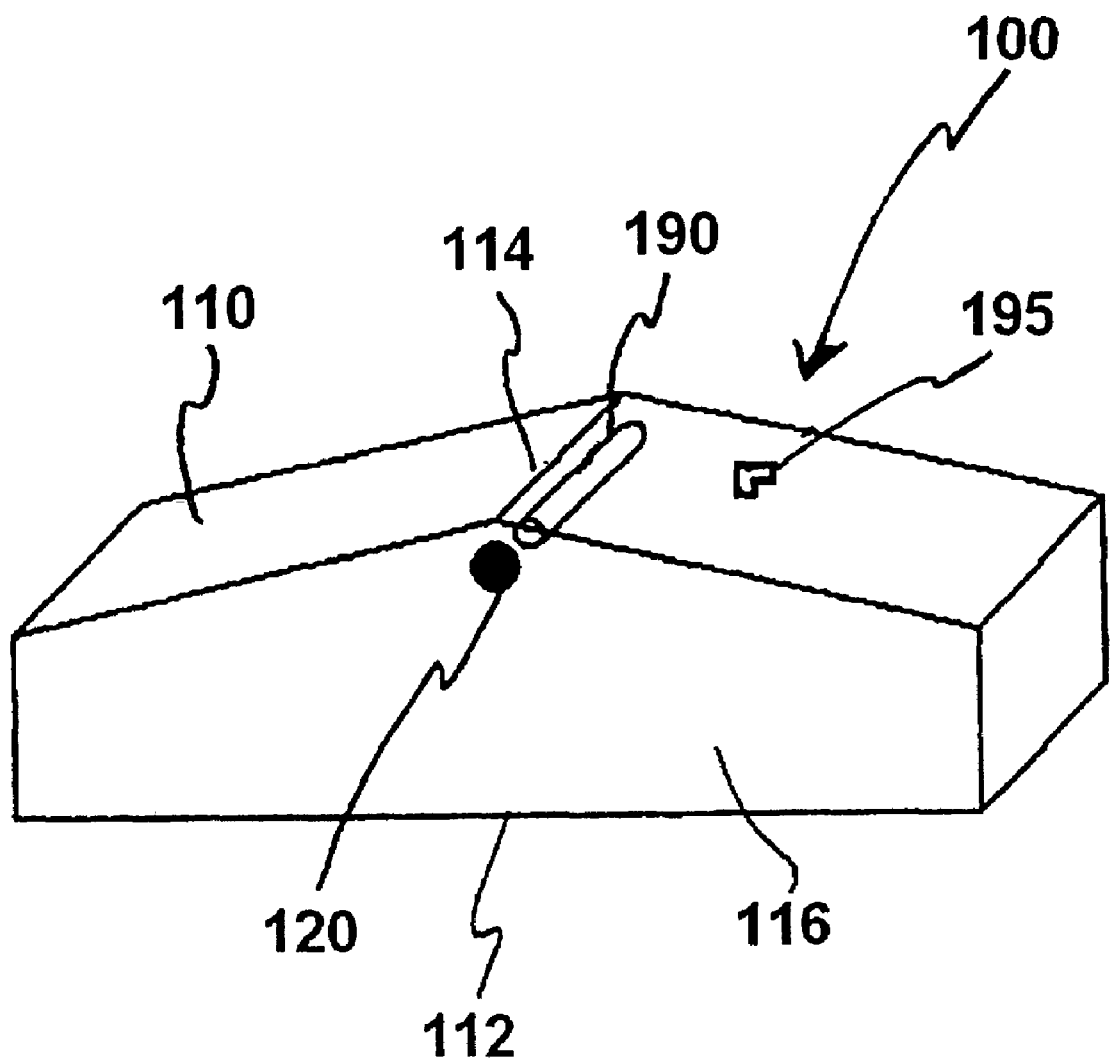
FIG. 2 is a partial view of the ultrasonic seepage meter of FIG. 1.

FIGS. 1 and 2 illustrate a preferred embodiment of an ultrasonic seepage meter 100 in accordance with the present invention. Generally, ultrasonic seepage meter 100 comprises collection funnel 110, flow meter 140, and controller logger 160. Collection funnel 110, as shown in FIGS. 1 and 2, further comprises an open bottom 112 and an enclosed top 114. The sides of collection funnel 110 form a square, each side being 0.46 m in length (corresponding to a capture area A=0.21 $m^2$), and at least 10 cm tall. However, it can be appreciated that collection funnel 110 may be of many different types of geometries and still be within the spirit of the present invention. Extending from side 116 of funnel 110 is discharge outlet 120. Discharge outlet 120 may also further comprise valve 122, which may be a ball valve. In a preferred embodiment, the top 114 of funnel 110 is angled so that the side 116 with discharge outlet 120 is slightly higher than the other side of funnel 110 (see FIG. 4).

Flow meter 140 is fluidly connected to discharge outlet 120. In a preferred embodiment, tygon tubing 124 is used to fluidly connect discharge outlet 120 with flow meter 140.

Figure 3:
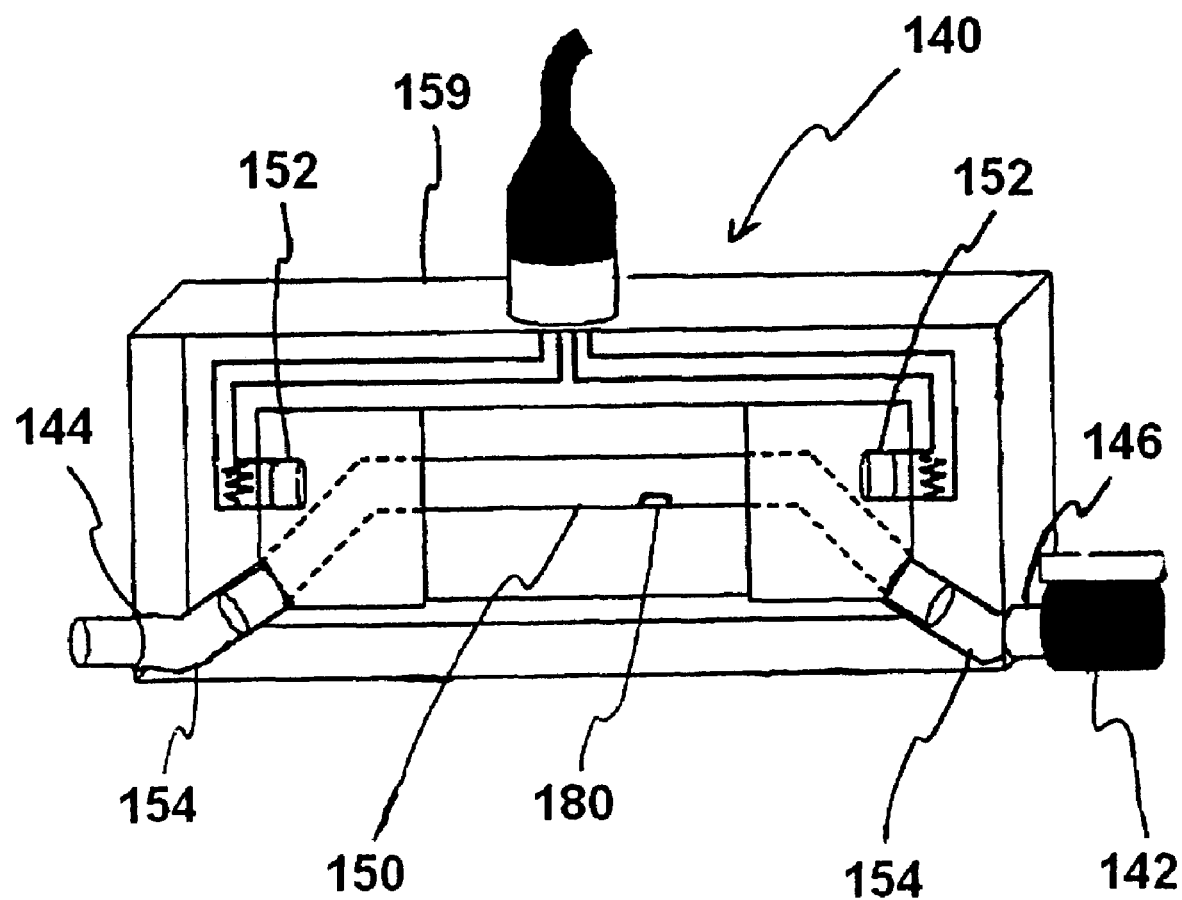
FIG. 3 is a partial cutaway view of the flow meter of the ultrasonic seepage meter of FIG. 1.

As shown in FIG. 3, flow meter 140 comprises inlet 144, outlet 146, ultrasonic flow tube 150, and piezoelectric transducers 152. In a preferred embodiment, ultrasonic flow tube 150 is a Controlotron ultrasonic flow tube (U.S. Pat. No. 5,467,321). Inlet 144, outlet 146, and ultrasonic flow tube 150 are fluidly connected to each other by tygon tubing 154. As water discharges from the collection funnel 110 it enters the flow meter 140 at inlet 144 and passes through tygon tubing 152 into ultrasonic flow tube 150. Two piezoelectric transducers 152 mounted at opposite ends of ultrasonic flow tube 150. Outlet 146 may further comprise a valve 142, which may be a ball valve. The components of the flow meter 140 are enclosed within watertight casing 159.

Piezoelectric transducers 152 continually generate bursts of ultrasonic signals from one end of ultrasonic flow tube 150 to the other end. Typically ~250 bursts are transmitted per second, and each burst is made up of ~40 periodic ultrasonic waves. As water flows through ultrasonic flow tube 150, the speed by which the water is moving through the flow tube affects the speed of the ultrasonic signals. Arrival of the ultrasonic signals is continuously monitored by piezoelectric transducers 152 which are in communication with control logger 160. Measurement of the sound waves provides the velocity data needed. The discharge exits through outlet 146.

Controller logger 160 is attached to the outside of the funnel 110 and is encased in water tight housing 161. Control logger 160 comprises a control module and a data logger and is in operative communication with flow meter 140. Control logger 160 controls the operation of flow meter 140 and also collects data received from flow meter 140. In a preferred embodiment (not shown), housing 161 has a clear end cap which displays controls that can be changed by the use of a magnetic wand. This allows for controller logger 160 to be programmed while underwater. In another embodiment, an rs232 port in housing 161 may be provided as an alternative programming source. Power supply 170 provides power to control logger 160 and flow meter 140. Power supply 170 is also encased in water tight housing 171.

As shown in FIG. 2, collection funnel 110 may also be provided with a probe 190 to measure other environmental data. In a preferred embodiment, a Solinst 3001 LTC probe (U.S. Pat. No. 5,117,698) that continuously records tidal stage, electrical conductance, and temperature of the water within the collection funnel. In a preferred embodiment, probe 190 is a self contained module with its own control and data collection system. In addition, collection funnel 110 may be equipped with port 302 through which water within collection funnel 110 may be sampled, as further described below.

Figure 4:
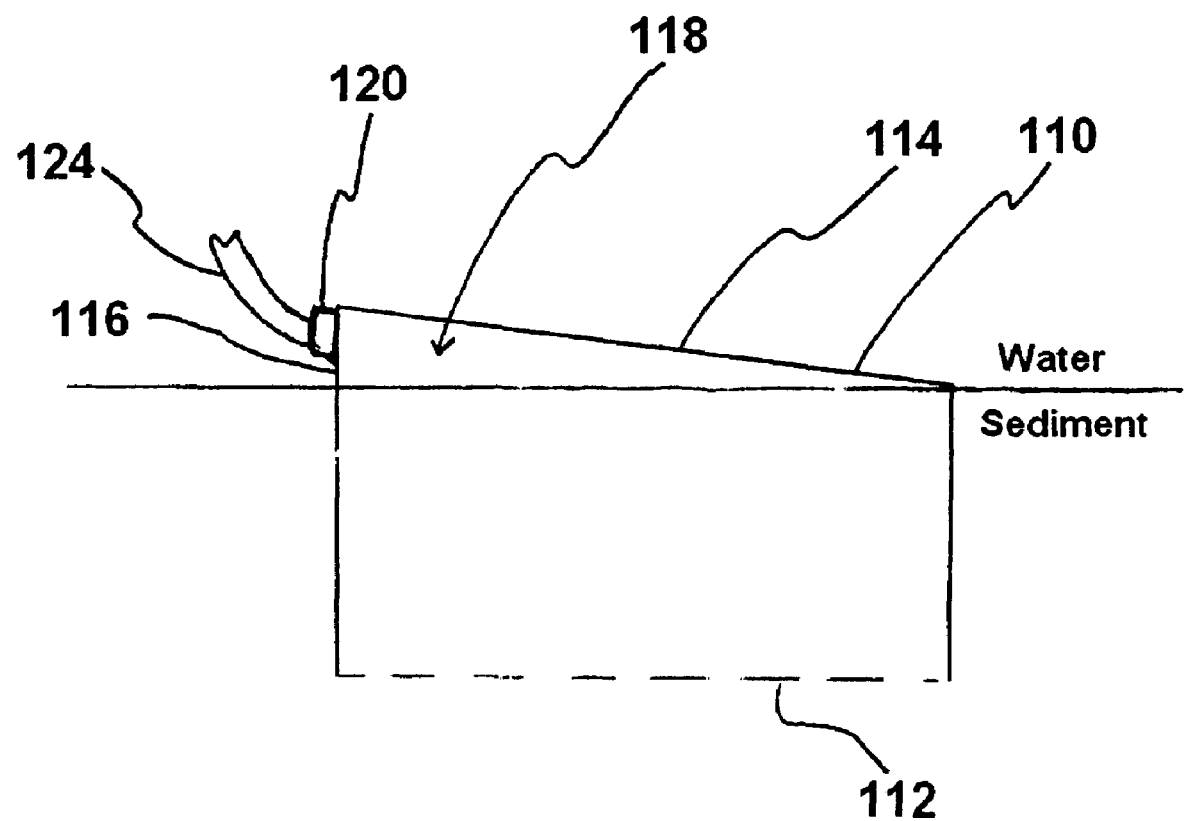
FIG. 4 is a partial side cutaway view of the ultrasonic seepage meter of FIG. 1.

In a typical application, as illustrated in FIG. 4, ultrasonic seepage meter 100 is installed into the bottom sediment of a marine or surface water environment. Collection funnel 110 is inserted into the bottom sediment in a marine or surface water environment, preferably to a depth of 10 cm. Funnel 110 preferably is installed so that bottom 112 is substantially parallel to the top surface of the bottom sediment, resulting in top 114 being angled slightly. This configuration and placement of funnel 110 creates a reliable seal with the sediment and reduces the chance of short-circuiting due to bottom heterogeneity or bio-irrigation from marine organisms, i.e., allows funnel 110 to effectively capture SGD. Because top 114 is angled slightly, discharge outlet 120 is slightly more elevated from the sediment bottom than the rest of funnel 110. This allows air and/or other gases ebulliating from the sediment to escape from funnel 110 through discharge outlet 120. By pressing funnel 110 into the sediment so that the lowest edge of top 114 is level with the sediment, headspace 118 (the open volume of funnel 110 above the sediment) is minimized, allowing for efficient flow of seepage fluid through funnel 110 and discharge outlet 120.

A field calibration is performed on the system by conducting a zero test. Valves 122 and 142 on the collection funnel 110 and the flow meter outlet 142 are both turned to the closed position. Control logger 160 is then programmed to perform a zero calibration so that travel times for the ultrasound waves are calibrated at a zero flow rate. Upon completion, valves 122 and 142 are reopened and the logger is programmed for data collection. In a preferred embodiment, the control logger is programmed to collect data at intervals from once every second to once every 24 hours. Control logger 160, may also be programmed to collect data such as time, date, site identification, flow rate, mean flow rate, total flow rate, velocity of sound, change in arrival times, and percent aeration in the flow tube 150. This data may be provided by sensors 180 located within flow tube 150 (see FIG. 3)and operatively connected to control logger 160. Methods of doing this are well known in the art. In a preferred embodiment, flow rates are measured in units of volume per time ($cm^3/s$) and a seepage velocity is obtained by dividing the calculated flow rate by the area of collection funnel 110.

The correlation between the salinity of water and the velocity f sound waves in the saline water under static flow conditions at a fixed temperature is well known. Therefore, the salinity of the groundwater discharge can be inferred from the average of the upstream and downstream speeds of the ultrasound waves through the flow tube, if the groundwater temperature is simultaneously measured. This information will assist the user in differentiating terrestrial groundwater from surrounding surface water in marine environments. Thus, the source of the discharge and any toxic or hazardous constituents present in the discharge may be more easily determined and quantified.

Laboratory and field calibrations show that the ultrasonic flow meter 100 can resolve groundwater discharges on the order of 0.1 µm/s (<1 cm/d), and it is sufficiently robust for deployment in the field for several days. The ability to acquire data at high rate (up to 400 times per second) allows the system to tolerate temperature density and aeration affects and still produces high-resolution accurate measurements. Flow meter 100 has also been found to be effective in measuring reverse flow rate, such as when a negative groundwater flux in which the overlying surface water is recharging the seepage zone.

Figure 5:
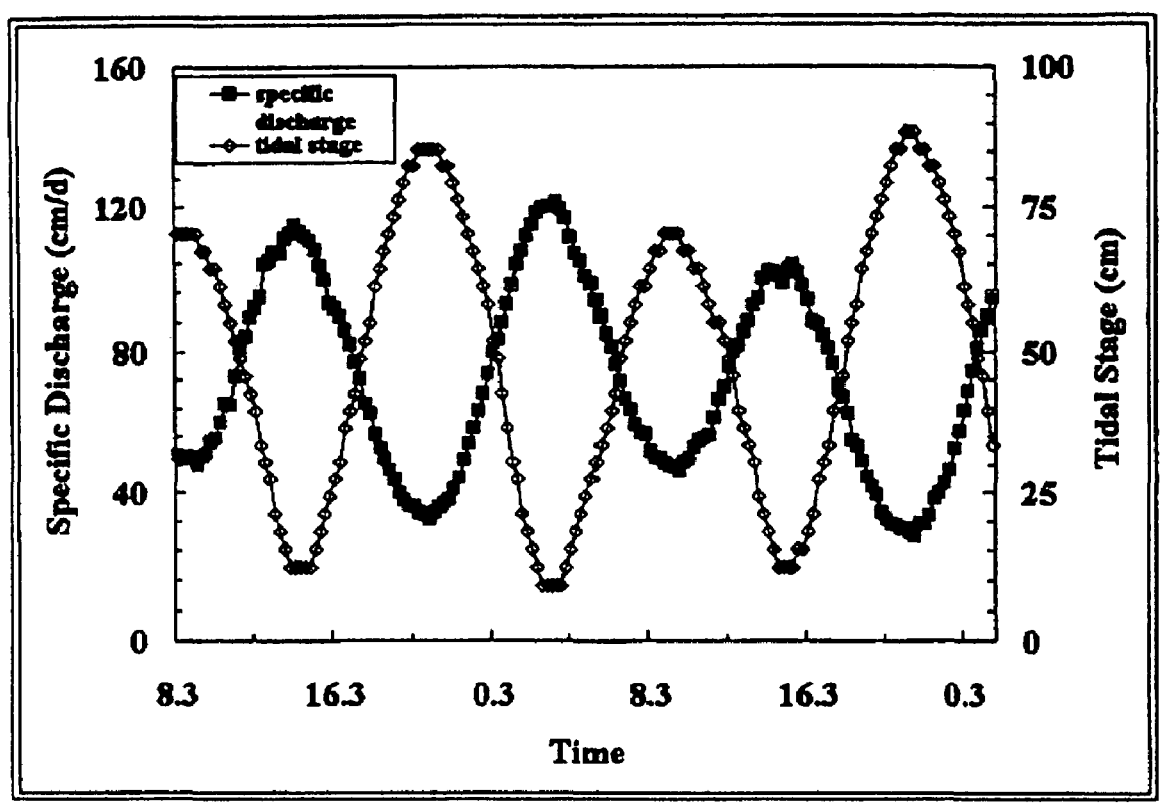
FIG. 5 is a graph illustrating data recorded using the ultrasonic seepage meter of FIG. 1 in West Neck Bay.

The present invention has been field tested and data show a relationship between seepage rate, tidal stage and hydraulic gradient from the onshore aquifer connection. This relationship results from the cyclic head changes that overlie the seepage zone and associated changes in hydraulic gradient. As tide rises, the receiving surface water hydraulic head is increasing, therefore limiting the vertical gradient between the seepage and the surface water. This leads to a decrease in the seepage flux across the sediment-water interface. As the tide is lowered, the vertical gradient begins to increase. An example data set collected in West Neck Bay, Shelter Island, N.Y. is shown in FIG. 5, where it can be seen that the maximum (and minimum) in tidal elevation do not correspond exactly to the minimum (and maximum) of seepage rate. In this data set, the phase lag between the tidal elevation and the seepage rate was ~1½ hours. This was presumably due to the transient fluctuation of the water table in response to tidal loading.

The present invention has the ability to be used to quantify contaminant or nutrient loading into a surface water body resulting from submarine groundwater discharge. Preferably, sampling occurs shortly after low tide corresponding to the maximum groundwater seepage rate (see FIG. 5). Prior to sampling, the rate of seepage is observed. The valves 122 and 142 of both the flow meter 140 and the collection funnel 110 are closed and tygon tubing (not shown) is connected to the collection funnel 110 at port 195. The tubing is connected to a manual peristaltic pump and water is pumped from the collection funnel 110 at a rate equal to the rate observed from the data logger prior to the closing of valves 122 and 142. This way, measurements are taken as close as possible to actual conditions. This water is collected and taken to the laboratory for analysis. Upon completion of the sampling, the valves 122 and 142 are reopened and collection of seepage rate data may be resumed.

It can be readily seen by those skilled in the art that a seepage meter in accordance with the present invention may take many different configurations in addition to the ones presented here while remaining within the spirit and scope of the present invention. Accordingly, it should be clearly understood that the embodiments of the invention described above are not intended as limitations on the scope of the invention, which is defined only by the following claims.

We claim:

1. A seepage meter, comprising:
   a collection device that confines a fluid, said collection device comprising a first opening and a second opening;
   an ultrasonic flow measurement device in fluid communication with said collection device, said ultrasonic flow measurement device generating a first signal corresponding to a volumetric flow rate of fluid that passing through the first opening; and
   one or more submersible dataloggers that record said first signal.

2. The seepage meter of claim 1, further comprising one or more valves that can isolate fluid flow through said ultrasonic flow measurement device.

3. The seepage meter of claim 2, further comprising a sampling system that collects a sample of said fluid from said collection device, said sampling system comprising a pump and a sample chamber.

4. The seepage meter of claim 3, wherein said sampling system collects said sample at said volumetric flow rate.

5. The seepage meter of claim 1, wherein said collection device further comprises a top, and said second opening is located at or near said top, thereby promoting removal of gases ebullating from said fluid.

6. The seepage meter of claim 5, wherein said first signal further corresponds to the direction in which fluid passes the first opening.

7. The seepage meter of claim 1, further comprising a temperature measurement device that generates a second signal corresponding to the temperature of the fluid.

8. The seepage meter of claim 7, wherein said one or more dataloggers record said second signal.

9. The seepage meter of claim 1, further comprising a conductivity measurement device that generates a third signal corresponding to the electrical conductance of the fluid.

10. The seepage meter of claim 9, further comprising a tidal stage measurement device that generates a fourth signal corresponding to head of fluid above said seepage meter.

11. The seepage meter of claim 10, further comprising a salinity measurement device that generates a fifth signal corresponding to salinity of the fluid.

12. The seepage meter of claim 11, wherein said one or more dataloggers record one or more of said third signal, said fourth signal and said fifth signal.

13. A method of determining seepage flow of a fluid, comprising:
   confining a flow of a fluid with a collection device;
   measuring a volumetric flow rate through the collection device using an ultrasonic flow device; and
   recording the measured flow rate with a submersible recorder.

14. The method of claim 13, further comprising placing the confining device into an underwater bed.

15. The method of claim 14, further comprising calibrating the ultrasonic flow device.

16. The method of claim 15, wherein the measured flow rate is recorded in both a forward and a reverse flow direction.

17. The method of claim 16, wherein the measured flow rate is recorded with a datalogger.

18. The method of claim 17, further comprising drawing a sample of the fluid.

19. The method of claim 18, wherein the sample is drawn at the measured flow rate.

20. A method of determining seepage flow of a fluid, comprising:

confining a flow of a fluid with a collection device;

measuring a volumetric flow rate of the fluid through the collection device using an ultrasonic flow device; and recording the measured flow rate with a datalogger, wherein said datalogger is designed for underwater control and use.

* * * * *